(12) United States Patent
Kaneko

(10) Patent No.: US 9,579,859 B2
(45) Date of Patent: Feb. 28, 2017

(54) MOLDING ELEMENT HAVING CUTTING MEANS FOR MOLDING AND VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Shuichi Kaneko, Tokyo (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 15/104,486

(22) PCT Filed: Oct. 15, 2014

(86) PCT No.: PCT/EP2014/072134
§ 371 (c)(1),
(2) Date: Jun. 14, 2016

(87) PCT Pub. No.: WO2015/090671
PCT Pub. Date: Jun. 25, 2015

(65) Prior Publication Data
US 2016/0325515 A1   Nov. 10, 2016

(30) Foreign Application Priority Data
Dec. 17, 2013 (FR) ..................... 13 62796

(51) Int. Cl.
*B29D 30/06* (2006.01)
*B29C 33/42* (2006.01)

(52) U.S. Cl.
CPC .......... *B29D 30/0606* (2013.01); *B29C 33/42* (2013.01); *B29C 33/424* (2013.01); *B29D 2030/0612* (2013.01); *B29D 2030/0613* (2013.01)

(58) Field of Classification Search
CPC ........ B29D 30/0606; B29D 2030/0612; B29D 2030/0613; B29C 33/42; B29C 33/424
See application file for complete search history.

(56) References Cited

U.S. PATENT DOCUMENTS 2,779,060 A    1/1957  Knox
3,012,599 A *  12/1961  Benson .............. B29D 30/0606
                                                152/209.22
3,415,923 A *  12/1968  Petersen ............ B29D 30/0606
                                                164/10
3,432,888 A    3/1969  Brierley
(Continued)

FOREIGN PATENT DOCUMENTS

WO         03/089257 A1   10/2003
WO      2013/087826 A1    6/2013

*Primary Examiner* — James Mackey
(74) *Attorney, Agent, or Firm* — Dickinson Wright PLLC

(57) ABSTRACT

The disclosure relates to a molding element of a mold for molding and vulcanizing a tire tread, this tread comprising a tread surface intended to come into contact with the ground when the said tire is running. The molding element includes a rib for molding a groove in the tire tread, the rib being a rounded end.

3 Claims, 2 Drawing Sheets

(56) References Cited

U.S. PATENT DOCUMENTS

| | | | | |
|---|---|---|---|---|
| 3,570,571 | A * | 3/1971 | Riches | B29D 30/0606 |
| | | | | 152/209.21 |
| 9,126,377 | B2 * | 9/2015 | Duvernier | B29D 30/0606 |
| 9,149,995 | B2 * | 10/2015 | Duvernier | B29D 30/0606 |
| 9,186,820 | B2 * | 11/2015 | Perrin | B29D 30/0606 |
| 9,415,555 | B2 * | 8/2016 | Ohashi | B29D 30/0606 |
| 9,421,725 | B2 * | 8/2016 | Ohashi | B29D 30/68 |
| 2013/0014871 | A1 | 1/2013 | Georges et al. | |

* cited by examiner

MOLDING ELEMENT HAVING CUTTING MEANS FOR MOLDING AND VULCANIZING A TIRE TREAD

CROSS-REFERENCE TO RELATED APPLICATIONS

This application is a 371 national phase entry of PCT/EP2014072134, filed 15 Oct. 2014, which claims the benefit of French Patent Application No. 1362796, filed 17 Dec. 2013, the contents of which are incorporated herein by reference for all purposes.

BACKGROUND

The present disclosure relates to the field of molds for molding and vulcanizing a tire tread. More specifically, the disclosure relates to the molds used for molding in the tread grooves which are partially or completely covered by an additional cover layer.

WO2012087826 discloses a molding element of a mold for molding and vulcanizing a tire tread. The molding element comprises a molding surface intended to mold part of the tire tread surface and a rib intended to mold a groove in the tread. In addition, the molding element comprises two lamellas positioned on either side of the rib at a certain distance from this rib, each lamella comprising a cutting edge, this cutting edge making an acute angle. The cutting edge is able to cut a cover layer that covers a green tire, The rib itself will mold a groove in the tread and at the same time guide part of the cover layer into the groove thus molded.

Document WO03089257 discloses a pneumatic tire which has fine grooves formed in a tread surface for improve brake and drive performance on ice-bound roads in early periods of wear, and which prevents snow clogging in the fine grooves, thereby enabling a further enhancement of the effect of improving the brake and drive performance.

There is a need to improve the conception of the mold for molding fine groove on the tread surface of the tire and in the same time incorporating a covering layer.

A "tire" means all types of elastic tire whether or not subjected to an internal pressure.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "rib" of a molding element means a protrusion projecting from the molding surface. A rib is intended to mold a groove in the tire tread. The width of the groove is 2 mm or more.

A "lamella" of a molding element means a protrusion projecting from the molding surface. A lamella is intended to mold a ripe in the tire tread The width of the lamella is less than 2 mm.

A "rib with a rounded end" means that the end of the rib is domed,

An "acute angle" means an angle smaller than 90°.

SUMMARY

The disclosure relates to a molding element of a mold for molding and vulcanizing a tire tread. The molding element comprises a rib intend to mold a groove in the tire tread, this rib comprising a rounded end. Indeed, the molding element comprises two cutting means positioned on either side of the rib at a certain distance from this rib, each cutting means comprises a cutting edge, this cutting edge making an acute angle. The molding element comprises a plurality of lamellas positioned between the rib and the cutting means, the lamellas being shallower than the ribs. The rib having a direction of extension X and each lamella having a direction of extension Y, the direction of extension Y of the lamella makes an angle α with the direction of extension X of the rib, this angle α being less than 20°.

The cutting means are able to cut a cover layer that covers a green tire. The rib itself will mold a groove in the tread and at the same time guide part of the cover layer into this groove thus molded. In the same time, the lamellas mold a plurality of sipes on the tread surface of the tire. Indeed, with the angle α we limit more unexpected trapping of the covering material.

In a variant, there is a minimum distance D between the rib and the nearest lamella, this distance is at least 1 mm, Thanks to this minimum distance, we limit unexpected trapping of the covering material by the lamella.

In a preferred embodiment, the angle α is less than or equal to 10°.

BRIEF DESCRIPTION OF THE DRAWINGS

Other features and advantages of the disclosure will emerge from the following description, given by way of non-limiting example, with reference to the attached drawings in which.

In the description that follows, elements that are substantially identical or similar will be denoted by identical references.

DETAILED DESCRIPTION

Figure 1:
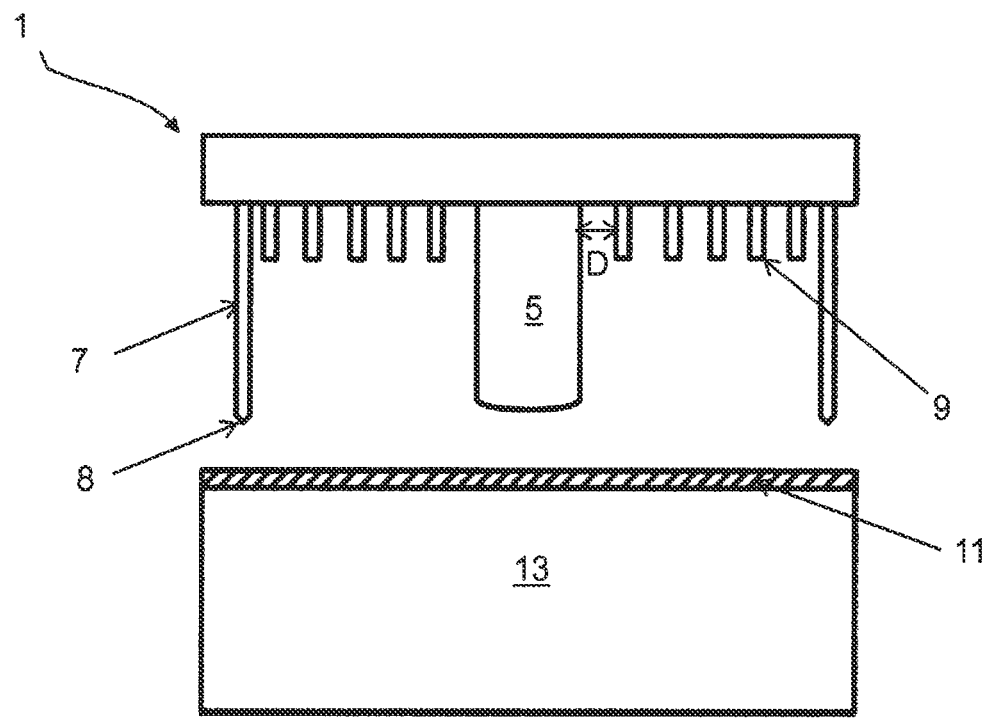
FIG. 1 schematically depicts a molding element according to the disclosure at a first step.

FIG. 1 depicts a molding element 1 according to the disclosure at a first step. The molding element 1 comprises a rib 5 and two cutting means 7 positioned on either side of the rib 5 at a certain distance from this rib. The cutting means 7 are able to cut a cover layer 11 that covers a green tire 13. The rib 5 itself will mold a groove in the tread and at the same time guide part of the cover layer into this groove thus molded.

More particularly, the rib 5 comprises a rounded end. The cutting means 7 comprises a cutting edge 8, the cutting edge making an acute angle. In a preferred embodiment, the acute angle is lower than or equal to 60°. In a variant, the acute angle is lower than or equal to 35°. In other variant, the acute angle is lower than or equal to 20°. Indeed, the molding element 1 comprises a plurality of lamellas 9 positioned between the rib 5 and the cutting means 7, the lamellas being shallower than the rib. More particularly, the lamella have a height between 0.1 and 0.8 mm, a width between 0.1 and 0.8 mm and the pitch of the lamellas being between 0.5 and 3.0 mm.

Figure 2:
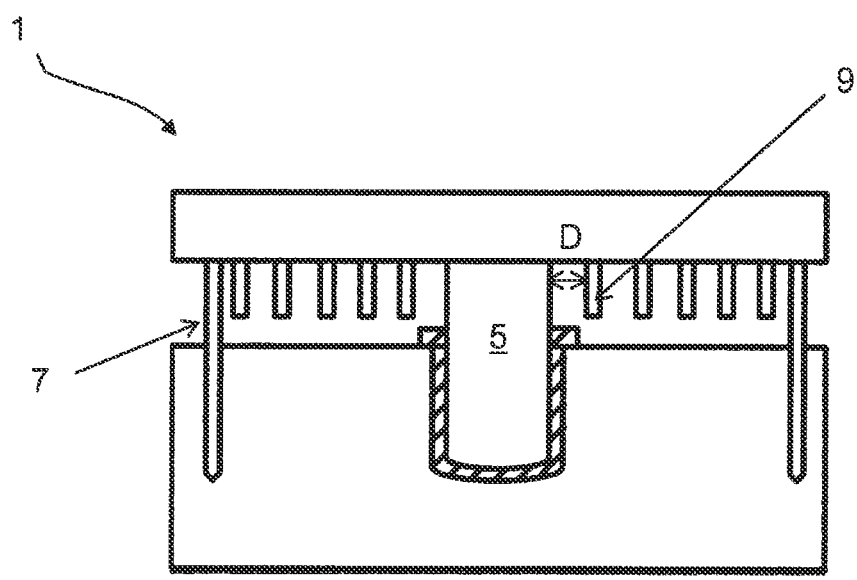
FIG. 2 schematically depicts the molding element of the FIG. 1 at a second step.

FIG. 2 depicts the molding element 1 of the disclosure at a second step. A this step, the molding element 1 and the green tire 9 move closer to one another. This movement is, for example, initiated by a membrane not depicted) in the mold. Under the action of a quantity of pressurized steam, this membrane swells and pushes the green tire towards the molding element 1. At the step of FIG. 2, the cutting means 7 have cut the cover layer 11. The rib 5 is molding a groove in the tread and at the same time guide part of the cover layer into this groove, The disclosure proposes to maintain a minimum distance D between the rib 5 and the nearest lamella 9. Thanks to this minimum distance, we limit unexpected trapping of the covering material by the lamella, More particularly, the distance D is at least 1 mm.

Figure 3:
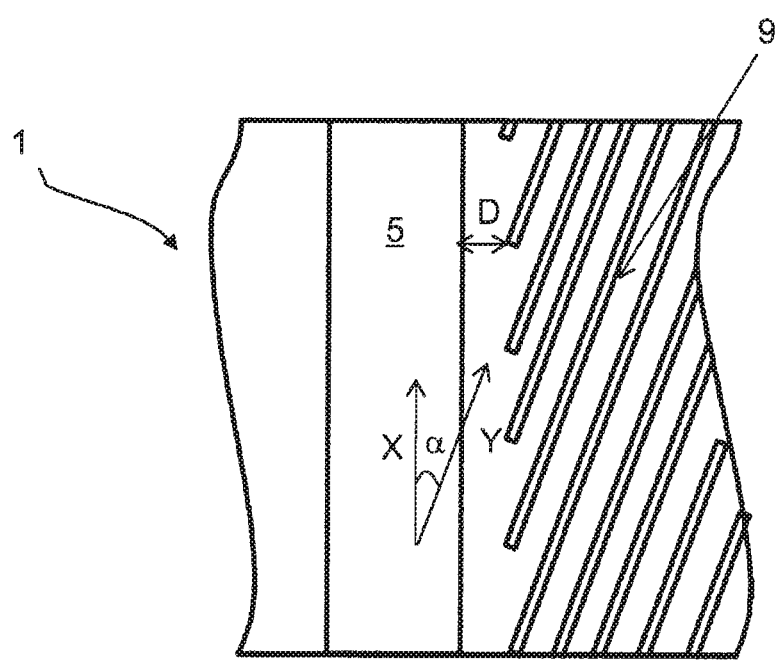
FIG. 3 illustrates the molding element of FIG. 1 in another view

FIG. 3 illustrates the molding element 1 of FIG. 1 in another view. In this view, the rib 5 has a direction of extension X and each lamella has a direction of extension Y. The direction of extension Y of the lamella makes an angle α with the direction of extension X of the rib, this angle α being less than 20°. In a preferred embodiment, the angle α is less than or equal to 10°.

The disclosure is not restricted to the examples described and depicted and various modifications can be made thereto without departing from its scope.

The invention claimed is:

1. A molding element of a mold for molding and vulcanizing a tire tread, comprising:
   a rib being able to be molded to a groove in the tire tread, the rib having a rounded end,
   two cutting means positioned on either side of the rib at a predetermined distance from the rib,
   each of the two cutting means including a cutting edge, the cutting edge forming an acute angle,
   a plurality of lamellas positioned between the rib and the cutting means, the plurality of lamellas being shallower than the rib, the rib having a direction of extension X and each lamella having a direction of extension Y, the direction of extension Y of the lamella makes an angle α with the direction of extension X of the rib, the angle α being less than 20°.

2. The molding element according to claim 1, wherein there is a minimum distance D between the rib and the nearest lamella, the minimum distance is being at least 1 mm.

3. The molding element according to claim 1, wherein the angle α is less than or equal to 10°.

\* \* \* \* \*